United States Patent Office 3,271,136
Patented Sept. 6, 1966

3,271,136
GOLD RECOVERY PROCESS USING AN ALKALI METAL HYDROSULFITE WITH A WATER SOLUBLE ALKALI METAL ALKANOATE
Charles Davidoff, 118 Rollinghill Road, Manhasset, N.Y.
No Drawing. Filed July 8, 1964, Ser. No. 381,214
8 Claims. (Cl. 75—118)

This application is a continuation-in-part of my co-pending application Serial No. 333,717, filed December 26, 1963.

This invention relates to a method for recovering gold, and more particularly to a method for recovering gold from a solution of alkali metal gold cyanide.

It is common knowledge that solutions of gold cyanide complex, usually in the form of potassium or sodium gold cyanide, exist in several fields of industry from which the gold must be recovered for obvious reasons of economy. Thus, in the mining industry, a widely employed method of recovering gold from ore containing the same involves leaching the gold from the ore with an aqueous solution of alkali metal cyanide, a solution of sodium or potassium gold cyanide being thereby obtained. For plating with gold, the most widely used plating solutions are solutions of sodium or potassium gold cyanide, from which solutions, either new, excess or used, the gold must be recovered. Also, a method of recovering gold from gold alloys such as scrap jewelry and the like involves treatment thereof with an aqueous solution of alkali metal cyanide.

In contrast to the many well established simple procedures for recovering gold from its uncomplexed ionic state such as trivalent gold, no really satisfactory method exists for recovering gold from its alkali metal cyanide complex. According to one presently employed procedure, the solution of gold cyanide complex is first treated, as by vacuum, to remove free oxygen which is needed in conjunction with the alkali metal cyanide to dissolve the gold but which interferes with the subsequent precipitation with zinc. The deoxygenated solution is then treated with zinc dust, usually for several hours and preferably overnight, to precipitate the gold and form a gold-zinc slurry. A small amount of lead acetate is usually added to help coagulate the gold-zinc slurry. The slurry is then filtered after which the filter cake is treated with acid to dissolve out the zinc and lead, and the mixture filtered again and the gold filter cake washed free of acid. According to a further improvement on this involved process, and to purportedly diminish or eliminate the need for preliminary deoxygenaiton of the pregnant solution, the zinc dust is first treated with alkali bisulfite and desirably alkali metal cyanide but this improvement obviously fails to eliminate the disadvantages of this process inherent in its overlong duration, plural filtrations, need for acid-proof equipment, etc. Further, any lead precipitated with the gold must be completely removed to prevent embrittlement of the gold. Similar considerations apply when this zinc precipitating process is employed for treating the so-called acid gold plating solutions containing the gold cyanide complex buffered with an organic acid such as citric or acetic acid to maintain a pH at or below 7.

In my said application Serial No. 333,717 I have described and claimed an improved method of recovering gold from a solution of alkali metal gold cyanide which is not subject to one or more of the above disadvantages comprising adding to the solution at least one reducing agent selected from the group consisting of alkali metal hydrosulfite and hydrazine hydrate in a molar amount at least equivalent to the gold in said solution, maintaining the resulting solution at an elevated temperature above about 150° F. until cessation of precipitation of the gold, and removing the precipitated gold from the solution. In said application Serial No. 333,717 I have also disclosed and claimed the addition to the solution of alkali metal gold cyanide, together with one or both of the above-mentioned reducing agents, of at least one member selected from the water soluble oxygen-containing group of compounds consisting of aldehydes, hydroxyl-containing amines and their acid salts, ammonium and alkali metal phosphates, hypohosphites and thiosulfates, and amino- and hydroxy-carboxylic acids and their ammonium and alkali metal salts in a combined molar amount of said reducing agent or agents and said member or members at least equivalent to the gold in said solution, whereby even further improvements are obtainable.

Although the inventive processes of said application Serial No. 333,717 are highly effective in expeditiously and quantitatively recovering gold from the average run of alkali metal gold cyanide solutions, it was found that for some unknown reason such processes failed to recover all the gold from certain commercial solutions containing relatively higher concentrations of alkali metal and cyanide or/and of the alkali metal gold cyanide complex, particularly under alkaline conditions. I subsequently discovered that although the gold in these solutions appeared to be quantitatively precipitated during the initial stage of the treatment, the precipitated gold began to redissolve in the solution as the treatment proceeded due apparently to the rapid buildup of alkali metal cyanide therein. This buildup is caused by the simultaneous liberation of 2 gram-moles of KCN or NaCN with every gram-mole of gold released by the action of the reducing agent on each gram-mole of $KAu(CN)_2$ or $NaAu(CN)_2$, and is sufficient, when occurring in alkaline solutions containing initially relatively higher concentrations of alkali metal cyanide and/or of alkali metal gold cyanide, to diminish the effectiveness of my recovery processes in the manner described above.

The problem could in some cases be minimized by diluting the solution with water to reduce the cyanide concentration, but sufficient dilution is often impractical or impossible. The problem could also be minimized by stopping the reaction and separating the precipitated gold from the reaction medium at the exact moment when precipitation has ceased, but this is likewise often impractical or inconvenient. A preferred solution to the problem would minimize the importance of the time factor whereby labor and other costs could be reduced, the precipitated gold could be separated at any time after cessation of precipitation at the convenience of the operator as for example after allowing the reaction mixture to stand overnight, etc., while at the same time accomplishing a substantially quantitative recovery.

According to the present invention, the aforesaid problem is minimized or eliminated by adding to the aqueous solution of alkali metal gold cyanide at least one reducing agent selected from the group consisting of alkali metal hydrosulfite and hydrazine hydrate in a molar amount at least equivalent to the gold in said solution and about 0.2 to 20 parts of a water soluble alkali metal alkanoate per part by weight of said reducing agent and, after cessation of precipitation of the gold, removing the precipitated gold from the solution. It has been unexpectedly found that the water soluble alkali metal alkanoate used in the above-described process functions by an as yet not understood mechanism as an inhibiting agent to prevent the precipitated gold from redissolving. A process is thus provided which constitutes a surprisingly simple, economical method of recovering gold from solutions of alkali metal gold cyanide in up to 100% yields without the need for the previously required acid-proof equipment and without regard to the initial concentrations of alkali metal cyanide and/or alkali metal gold cyanide in such solutions or the length of time after cessation of precipitation of the gold during which the precipitated gold is permitted to remain in contact with the reaction medium.

The reducing agent employed in my process may be an alkali metal hydrosulfite or hydrazine hydrate or a mixture thereof. An alkali metal hydrosulfite such as sodium or potassium hydrosulfite is preferred, it being understood that zinc hydrosulfite is to be regarded as equivalent, operative herein, and within the scope of the invention and the term alkali metal hydrosulfite. Also operative and included within the scope of this invention is the use of substances which liberatively provide such hydrosulfites in the gold cyanide solution being treated, as for example the sodium, potassium and zinc formaldehyde and acetaldehyde sulfoxylates. These reducing agents may be employed in conjunction with at least one member of the water soluble oxygen-containing group of compounds referred to above and in my said application Serial No. 333,717 consisting of aldehydes, hydroxyl-containing amines and their acid salts, ammonium and alkali metal phosphates, hypophosphites and thiosulfates, and amino- and hydroxy-carboxylic acids and their ammonium and alkali metal salts.

The water soluble alkali metal alkanoate employed as the solution-inhibiting agent herein is a sodium or potassium salt of a lower alkanoic acid, i.e. of an alkane mono- or polycarboxylic acid containing about 1–4 carbon atoms in the alkane group. As non-limiting examples, there may be mentioned mono- and di-sodium and -postassium oxalate, malonate and succinate, and preferably sodium and potassium formate, acetate, propionate, butyrate and isobutyrate.

In carrying out the process of this invention, the reducing agent, e.g. alkali metal hydrosulfite, is added to the alkali metal gold cyanide solution in molar proportions relative to the gold in the solution of at least 1:1 up to 15:1 or more, preferably about 1–6:1, before, together with or after about 0.2 to 20, preferably about 0.5 to 5, and optimally about 1, parts of the water soluble alkali metal alkanoate per part by weight of the reducing agent, optimum porportions in any particular instance being readily determinable by routine experimentation. It is always preferable to employ an excess of the precipitant reducing agent, which is relatively inexpensive, to ensure recovery of all the gold in the solution. The temperature of the reaction medium may range from room temperature up to the boiling point, but to increase the rate of reaction and precipitation, the medium is preferably maintained at elevated temperatures of above about 150°F., preferably about 180–200° F., at least until cessation of precipitation of the gold which may take from about 5 minutes to 2 hours and usually about ¼ to ¾ of an hour. With lower temperatures, up to one or two days may elapse before completion of the precipitation step, whereafter the gold may be removed at any time from the reaction medium by filtration or other usual means. The reaction medium may if desired be agitated during at least part of the precipitation process.

The process of this invention has been found to be highly effective in selectively precipitating gold in substantially pure and readily filterable form from alkali metal gold cyanide solutions containing such other base metals or contaminants also dissolved therein as copper, zinc, nickel, lead, and platinum and the like. Such solutions, as described above, may be formed in the cyanide treatment of gold-containing ores and alloys, and in electroplating processes employing the gold cyanide complex. By way of example, solutions of this type are formed in the porous cup technique for electrolytically dissolving gold-base metal alloys according to which the alloy is used as anode in an electrolyte of alkaline cyanide such as sodium or potassium cyanide while the cathode is shielded by a porous cup to prevent the gold from plating thereon. The resulting electrolyte to be treated by the process of this invention therefore contains dissolved therein the gold, as cyanide complex, and base metals originally present in the alloy. If any slight amounts of such base metals precipitate with the gold, they may be readily leached out by treating the precipitate with acid, if their presence in the recovered gold is prohibited. Any silver present in the gold cyanide solution will be precipitated with the gold by the present process, but can be readily separated from the gold in similar manner, e.g. by leaching the silver from the precipitate with nitric acid.

Although the process of this invention is substantially independent of the pH and cyanide concentration of the gold cyanide solution being treated, the process is most advantageously applied to such solutions which contain at least about 10 grams per liter of free alkali metal cyanide and have an alkaline pH, particularly those having a pH more than 10.5 up to 14 or more since the problem of redissolution of the precipitated gold is most serious with such solutions. Similarly, the process is operative on solutions containing any amount or concentration of alkali metal gold cyanide, the minimum concentration being established in any particular instance by only economic factors; unless dictated by other considerations, gold concentrations so low as to result in the value of the recovered gold being below the cost of the recovery process would ordinarily not justify use of the process. The maximum operative concentration is of course that of a saturated solution.

The following examples are only illustrative of this invention and are not to be regarded as limitative. All parts and proportions referred to herein and in the appended claims are by weight unless otherwise indicated.

*Example 1*

To a gold cyanide 10 cc. sample of a solution containing, per liter, 3.7 grams of gold as potassium gold cyanide, 21 grams of KCN, and 188 grams of KOH, there is added a mixture of 0.05 gram of sodium hydrosulfite and 0.05 gram of sodium acetate with agitation, the resulting mixture maintained at a temperature of about 180° F. for 20 minutes and the precipitated gold filtered off and weighed to determine the yield or percent recovery of the gold originally present in the solution. The same procedure is repeated for 40 and 60 minute durations to determine the degree of redissolution of precipitated gold.

For comparative purposes, the procedure of the preceding paragraph is repeated but using dextrose and sodium citrate, respectively, instead of sodium acetate. The results of these procedures are shown in the following table.

| Precipitant | Percent Recovery After— | | |
|---|---|---|---|
| | 20 min. | 40 min. | 60 min. |
| 0.05 g. Na hydrosulfite<br>0.05 g. dextrose | 100 | 87 | 51 |
| 0.05 g. Na hydrosulfite<br>0.05 g. Na citrate | 78 | 100 | 85 |
| 0.05 g. Na hydrosulfite<br>0.05 g. Na acetate | 81 | 100 | 100 |

The above results show that a 100% recovery is obtainable with each of the precipitant mixtures, but that whereas redissolution of gold begins after 20 minutes using dextrose as additive and after 40 minutes using sodium citrate as additive, the use of sodium acetate as additive results in a 100% recovery after 40 minutes and an effective inhibition of subsequent redissolution of the precipitated gold. The use of 0.10 g. of sodium hydrosulfite as the sole precipitant in the above procedure yields results approximating those obtained with the mixture of 0.05 g. each of sodium hydrosulfite and dextrose. When other water soluble alkali metal alkanoates described above are employed in the procedure of this example instead of the sodium acetate, similarly improved results are obtained.

*Example II*

When the procedure of Example I is repeated but using as the initial gold cyanide solution a 10 cc. sample of a solution containing, per liter, 37 grams of gold as potassium gold cyanide, 30 grams of KCN, and 150 grams of KOH, and 0.5 gram each of sodium hydrosulfite and additive in each of the precipitant mixtures, similarly improved results are obtained with respect to percent recovery and inhibition of redissolution of precipitated gold.

This invention has been disclosed with respect to certain preferred embodiments, and it will be understood that various modifications and variations will become obvious to persons skilled in the art and are to be included within the spirit and purview of this invention and application and the scope of the appended claims.

I claim:

1. A method of recovering gold from an aqueous solution of alkali metal gold cyanide comprising adding to the solution an alkali metal hydrosulfite in a molar amount at least equivalent to the gold in said solution and about 0.2 to 20 parts of a water soluble alkali metal alkanoate per part by weight of the hydrosulfite, maintaining the resulting solution at an elevated temperature above about 150° F. until cessation of precipitation of the gold, and removing the precipitated gold from the solution.

2. A method of recovering gold from an aqueous solution of alkali metal gold cyanide comprising adding to the solution an alkali metal hydrosulfite in a molar amount at least equivalent to the gold in said solution and about 0.2 to 20 parts of alkali metal acetate per part by weight of the hydrosulfite, maintaining the resulting solution at an elevated temperature above about 150° F. until cessation of precipitation of the gold, and removing the precipitated gold from the solution.

3. A method of recovering gold from an aqueous solution of alkali metal gold cyanide comprising adding to the solution of sodium hydrosulfite in a molar amount at least equivalent to the gold in said solution and about 0.2 to 20 parts of sodium acetate per part by weight of the hydrosulfite, maintaining the resulting solution at an elevated temperature above about 150° F. until cessation of precipitation of the gold, and removing the precipitated gold from the solution.

4. A method of recovering gold from an aqueous solution of alkali metal gold cyanide comprising adding to the solution of sodium hydrosulfite in a molar amount at least equivalent to the gold in said solution and about 0.5 to 5 parts of sodium acetate per part by weight of the hydrosulfite, maintaining the resulting solution at an solution at an elevated temperature above about 150° F. until cessation of precipitation of the gold, and removing the precipitated gold from the solution.

5. A method of recovering gold from an aqueous solution of alkali metal gold cyanide comprising adding to the solution of sodium hydrosulfite in a molar amount at least equivalent to the gold in said solution and about 1 part of sodium acetate per part by weight of the hydrosulfite, maintaining the resulting solution at an elevated temperature above about 150° F. until cessation of the precipitation of the gold, and removing the precipitated gold from the solution.

6. A method of recovering gold from an aqueous solution of alkali metal gold cyanide comprising adding to the solution an alkali metal hydrosulfite in a molar amount at least equivalent to the gold in said solution and about 0.2 to 20 parts of a water soluble alkali metal alkanoate per part by weight of the hydrosulfite, and after cessation of precipitation of the gold, removing the precipitated gold from the solution.

7. A method of recovering gold from an aqueous solution of alkali metal gold cyanide comprising adding to the solution an alkali metal hydrosulfite in a molar amount at least equivalent to the gold in said solution and about 0.2 to 20 parts of alkali metal acetate per part by weight of the hydrosulfite, and after cessation of precipitation of the gold, removing the precipitated gold from the solution.

8. A method of recovering gold from an aqueous solution of alkali metal gold cyanide comprising adding to the solution of sodium hydrosulfite in a molar amount at least equivalent to the gold in said solution and about 0.2 to 20 parts of sodium acetate per part by weight of the hydrosulfiite, and after cessation of precipitation of the gold, removing the precipitated gold from the solution.

References Cited by the Examiner

UNITED STATES PATENTS

| | | | |
|---|---|---|---|
| 545,852 | 9/1895 | De Wilde | 75—106 |
| 1,426,517 | 8/1922 | Sulyberger | 75—108 |
| 1,479,542 | 1/1924 | Hirschkind | 75—106 |
| 3,147,154 | 9/1964 | Cole et al. | 75—108 |
| 3,215,524 | 11/1965 | Fetscher et al. | 75—106 |

References Cited by the Applicant

UNITED STATES PATENTS

| | | |
|---|---|---|
| 2,100,865 | 11/1937 | Mills et al. |
| 2,913,336 | 11/1959 | Dean. |
| 2,945,757 | 7/1960 | Hoekstra. |

DAVID L. RECK, *Primary Examiner.*

N. F. MARKVA, *Assistant Examiner.*